Figure 1:
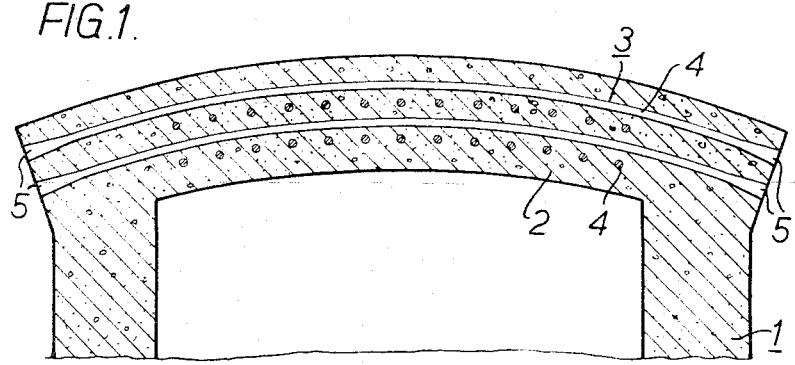

Dec. 20, 1966   N. T. BARRETT   3,292,317
PRESTRESSED CONCRETE PRESSURE VESSEL
Filed May 13, 1963   3 Sheets-Sheet 1

Dec. 20, 1966    N. T. BARRETT    3,292,317
PRESTRESSED CONCRETE PRESSURE VESSEL
Filed May 13, 1963    3 Sheets-Sheet 3

United States Patent Office 3,292,317
Patented Dec. 20, 1966

3,292,317
PRESTRESSED CONCRETE PRESSURE VESSEL
Norman Thomas Barrett, Culcheth, near Warrington, England, assignor to United Kingdom Atomic Energy Authority, London, England
Filed May 13, 1963, Ser. No. 279,732
Claims priority, application Great Britain, May 25, 1962, 20,305/62
7 Claims. (Cl. 52—81)

This invention relates to pressure vessels and is primarily concerned with pressure vessels for nuclear reactors.

The core of a nuclear reactor is generally enclosed within a massive concrete structure to preclude the escape of harmful radiations. Heat transfer from the core is in many kinds of nuclear reactor effected by means of a coolant fluid operating in a pressurised system in which case the reactor core is also required to be enclosed in a pressure vessel. Because of the massive size of a pressure vessel required to enclose the core of the reactor where the fuel enrichment is low or of natural abundance, the vessel is generally constructed from fusion welded steel plates having thickness within the range 2" to 4½" and being of such proportions is difficult and expensive to construct. The construction is rendered more complex by the requirement for radiographic examination of the seam welds to ensure complete pressure tightness, for final stress relief by a complex heat treatment process, and for pressure testing prior to the commencement of operation. Recently proposals have been made (for instance as described in British specification No. 861,513) to utilise a concrete pressure vessel capable of fulfilling the dual purpose of providing biological shielding and enclosing the reactor core with its pressurised coolant fluid. To preclude tensile loads in the concrete structure the vessel is arranged to be embraced by post-tensioned members which oppose the forces resulting from the pressurised fluid. However, prior proposals have been restricted to cylindrical pressure vessels having hemispherical ends, the ends being arranged with their concave sides facing outwardly so that the concrete structure of the ends is subject only to compressive and shear loads and not required to be braced. Tensile loads induced in the cylindrical section of the vessel as a result of pressure on the hemispherical ends are opposed by tie members extending therethrough. Vessels of this type, however, suffer disadvantage in that optimum internal volume commensurate with the external proportions of the vessel is not obtained. Furthermore, the said construction has rapid changes of direction between the barrel portion and the hemispherical ends which would introduce weak points into the structure.

It is an object of the present invention to provide a prestressed concrete pressure vessel braced by an improved arrangement of pre-stressing tensioned tendons.

By "prestressed concrete pressure vessel" is meant a concrete pressure vessel having compressive stress induced within it structure prior to pressurising with gas or liquid so that, when containing pressure, induced tensile stresses are completely or partially nullified. By "tensioned tendon" is meant a wire, rod or cable tensioned preferably after but alternatively before or during construction of the vessel and which may or may not be adjustably tensioned after pressurising.

According to the invention, a portion of a prestressed concrete pressure vessel is braced by a structure of tensioned tendons which are disposed in a plurality of arrays of tendons. The first array lies on a portion of a sphere and the tendons of that array lie on arcs derived of great circles of a first two polar spherical system of that sphere in which system the great circles pass through the poles. The structure includes at least one other array of tendons. Theoretically, the other array or arrays lie on the same portion of the same sphere as the first array and the tendons of the other array or arrays lie on arcs of great circles derived of different two polar spherical systems on the same sphere as the first array. The poles of the spherical systems are coplanar. The theoretical structure is further defined by the fact that all arrays (that is, the portion of the sphere where the arrays are located) excludes the poles of the spherical system but includes a point defined by the intersection of further great circles of the spherical systems which lie in planes normal to the common plane of the poles.

In practice, of course, since the various arrays cannot actually pass through each other they cannot be located on exactly the same spherical surface but rather, they must be positioned in closely adjacent concentric spheres. However, if the concentric spheres are close to each other the theoretical structure described above can be closely approximated and the advantages of the structure discussed earlier can still be obtained. In the actual structure the poles of all the spherical systems of the portion of the vessel would still be coplanar; and the portions of the spheres containing the arrays of tendons would be radially adjacent, with respect to a radius of the spheres, rather than coincident. Further, in the actual structure the portions of the spheres including the arrays will all "intersect a radial line" which lies in the plane of the great circles of each sphere which plane is normal to the said planes of the poles rather than "include the point" as in the theoretical structure.

Preferably the vessel defines a chamber which is at least part spherical or part spheroidal and the arrays of tendons are associated with that part of the shell which bounds the spherical or spheroidal regions of the shell.

Figure 2:
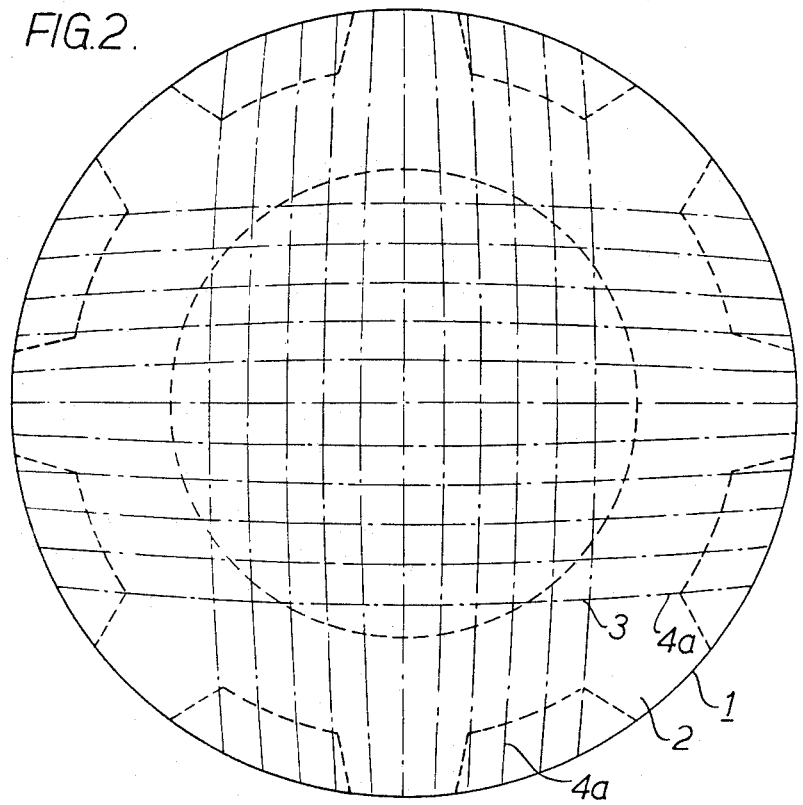
Figure 3:
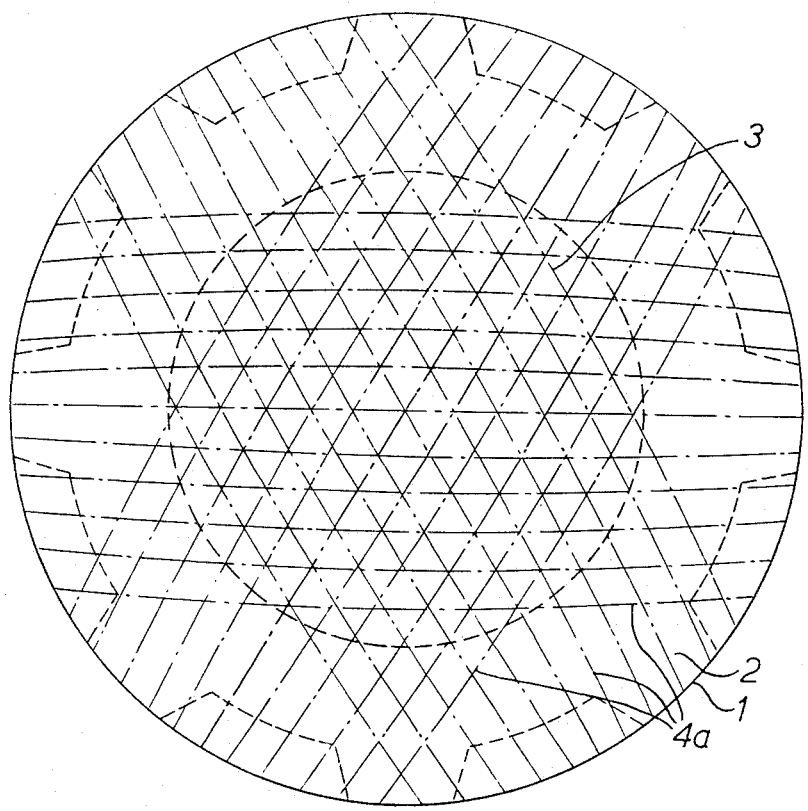
Figure 4:
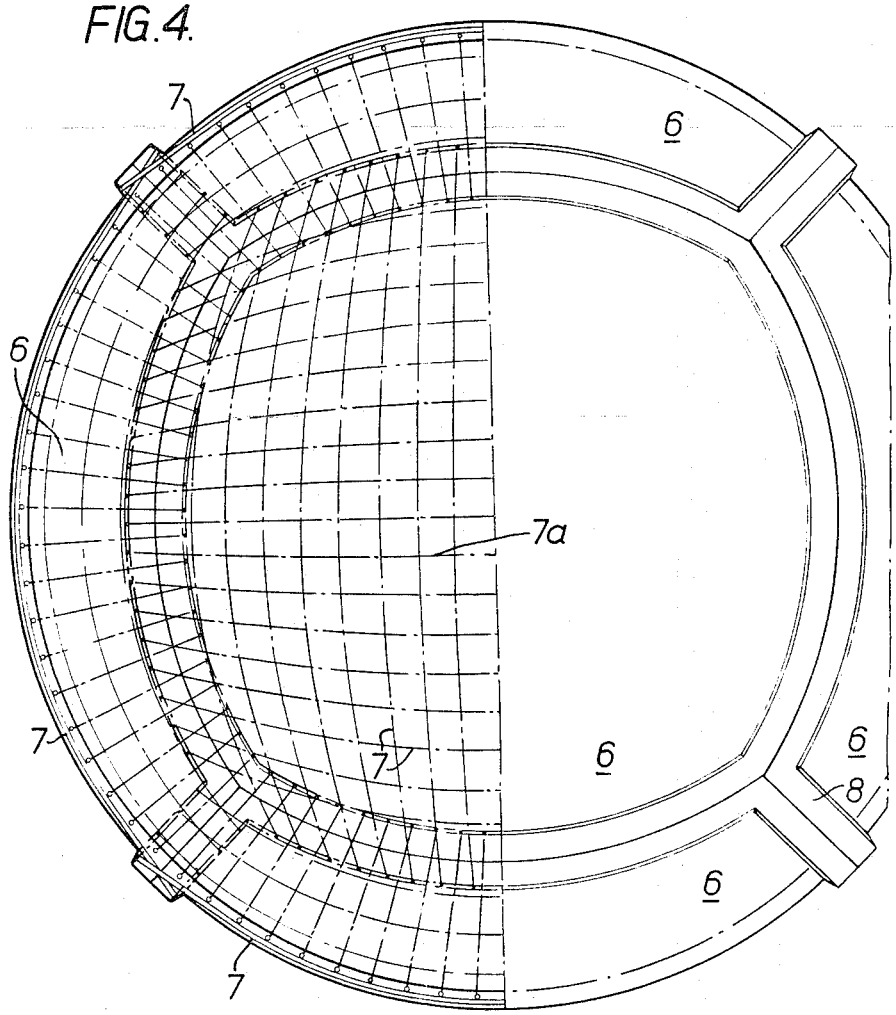
Figure 5:
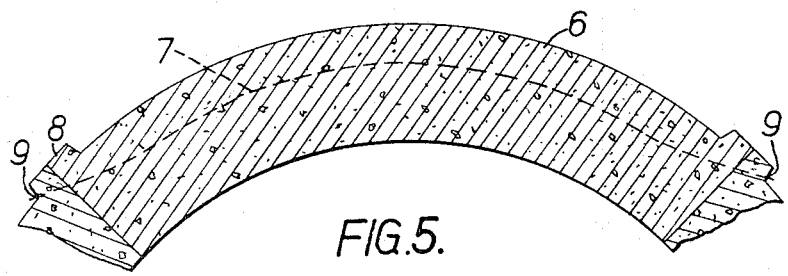

Embodiments of the invention will now be described, by way of example, with reference to the accompanying drawings wherein:

FIGURE 1 is a fragmentary sectional view of a generally cylindrical concrete vessel, FIGURE 2 is a plan view of the vessel, FIGURE 3 is a plan view of a second embodiment of generally cylindrical concrete vessel, FIGURES 4 is a fragmentary plan view of a spherical concrete vessel, and FIGURE 5 is a fragmentary plan view in section on a line passing through the equator of the spherical vessel of FIGURE 4.

In FIGURE 1 there is shown the upper regions of a cylindrical concrete pressure vessel 1 having a part-spherical dome 2 which is provided with an array 3 of tendons 4. The tendons are housed in conduits preformed in the concrete during casting and are post-tensioned by hydraulic jacks prior to anchoring at the edges of the concrete at points designated 5. Typical post-tensioning techniques and suitable cable anchorages are described on pages 184 and 188 of "Pre-Stressed Concrete Design and Construction" by F. Whalley and published by Her Majesty's Stationery Office. The tendons oppose forces set up by fluid pressure within the vessel and thereby reduce tensile stresses within the concrete to within acceptable limits or eliminate them. The tendons 4 are disposed in four arrays wherein the poles of the first and third arrays are colinear and the poles of the second and fourth arrays are colinear and all poles are coplanar. FIGURE 2 shows the theoretical structure of the embodiment of FIG. 1 in which the lines 4a indicate the axes of the tendons arranged in two groups of great circle paths. By way of explanation of the principle involved and of the invention derived therefrom, if a spherical vessel is embraced by a structure comprising a single array of tendons the system having merely one pair of poles it will be seen that the cross-section of the sphere having the maximum tensile strength will be in the plane which coincides with the equator and because of the equal spacing of the tendons at this cross-section will also have the most uniform distribution of tensile strength. The cross-section which coincides with a plane through the polar axis will be of low strength and, because of the convergence of the tendons, will have the least uniform distribution of tensile strength. If an array of tendons be used to provide a second pair of poles then a second cross-section having high tensile strength and uniform distribution of strength will be created in the plane coinciding with the second equator. The intersections of the equators define points of relatively high tensile strength on the sphere with a substantially uniform distribution of tensile strength in the area about each point. Thus, it will be appreciated, the tensile strength of the spherical portion of a concrete pressure vessel is optimised by selecting for embodiment that part of the braced shell of the sphere which includes the said point of the intersection of the equators. Preferably the edge anchors are evenly spaced but reference to FIGURE 2 shows that whilst the tendons 4 span the cylindrical chamber in a uniform pattern the edge anchors are not uniformly spaced round the circumference of the end cap. FIGURE 3 shows a pressure vessel of identical proportions but including three arrays of tendons and thus including three pairs of poles in a common plane. In this embodiment the edge anchors of the tendons are more uniformly spaced and it can be seen that even greater edge perimeters can be utilised having uniformly spaced edge anchors by increasing the numbers of pairs of co-planar poles.

FIGURE 4 shows a complete spherical concrete pressure vessel constructed from six panels 6 each panel being cabled with tendons 7 in an arrangement 7a as indicated by chain-dot lines on one part of the figure. The arrangement 7a includes two arrays of tendons and has two pairs of poles and includes a point of intersection of the equators. The periphery of each panel has a rib 8 by means of which the panels are secured together and, as shown in FIGURE 5, the tendons are conducted through the concrete of the panel to pass through the ribs 8 where they are anchored. In a similar manner a hemispherical portion of a pressure vessel can be constructed using a panel 6 and four half panels (not shown).

The invention is not restricted to pressure vessels having spherical or part-spherical outer profiles. For example, whilst the inner profile is spherical or part-spherical the outer profile may be faceted and the thickness of concrete be varied in any convenient manner.

A concrete vessel constructed in a manner according to the invention for use as a nuclear reactor pressure vessel would preferably have a membrane lining to ensure impermeability of the concrete walls of the vessel which might otherwise permit escape of the pressurized coolant gas.

I claim:
1. A prestressed concrete pressure vessel having a portion braced by a structure of tensioned tendons lying within the concrete, said tendons being disposed in at least two arrays, each array lying on a portion of a sphere and each tendon of that array lying on a great circle of the sphere which great circle passes through the poles of the sphere, said spheres being substantially concentric and the poles of the said spheres all lying in substantially the same plane the corresponding poles of each sphere being spaced apart in said plane, and all said sphere portions intersecting a radial line which lies in the plane of that great circle of each sphere which plane is normal to the said plane of the poles.

2. A prestressed concrete pressure vessel according to claim 1, wherein the vessel defines a chamber which is at least part spheroidal and the said arrays of tendons are associated with that part of the shell which bounds the spheroidal region of the shell.

3. A prestressed concrete pressure vessel according to claim 1, wherein the said structure includes three arrays of tendons.

4. A spherical pre-stressed concrete pressure vessel comprising a plurality of panels, each panel braced by a structure of tensioned tendons lying within the concrete, said tendons being disposed in at least two arrays, each array lying on a portion of a sphere and each tendon of that array lying on a great circle of the sphere which great circle passes through the poles of the sphere, said spheres being substantially concentric and the poles of the said spheres all lying in substantially the same plane, the corresponding poles of each sphere being spaced apart in said plane, and all said sphere portions intersecting a radial line which lies in the plane of that great circle of each sphere which plane is normal to the said plane of the poles.

5. A prestressed concrete pressure vessel having a hemispherical part which comprises concrete panels, each panel braced by a structure of tensioned tendons lying within the concrete, said tendons being disposed in at least two arrays, each array lying on a portion of a sphere and each tendon of that array lying on a great circle of the sphere which great circle passes through the poles of the sphere, said spheres being substantially concentric and the poles of the said spheres all lying in substantially the same plane, the corresponding poles of each sphere being spaced apart in said plane, and all said sphere portions intersecting a radial line which lies in the plane of that great circle of each sphere which plane is normal to the said plane of the poles.

6. A nuclear reactor installation having a prestressed concrete pressure vessel braced by a structure of tensioned tendons lying within the concrete, said tendons being disposed in at least two arrays, each array lying on a portion of a sphere and each tendon of that array lying on a great circle of the sphere which great circle passes through the poles of the sphere, said spheres being substantially concentric and the poles of the said spheres all lying in substantially the same plane, the corresponding poles of each sphere being spaced apart in said plane, and all said sphere portions intersecting a radial line which lies in the plane of that great circle of each sphere which plane is normal to the said plane of the poles.

7. A nuclear reactor installation according to claim 6 wherein the vessel has an impervious membrane lining.

References Cited by the Examiner

UNITED STATES PATENTS

| | | | |
|---|---|---|---|
| 1,189,694 | 7/1916 | Janssen | 50—129 |
| 2,558,580 | 6/1951 | Pomykala | 50—129 X |
| 2,902,157 | 1/1959 | Culver | 50—133 X |
| 2,927,452 | 3/1960 | Heidenstam | 50—129 |
| 2,932,964 | 4/1960 | Dobell | 50—129 |

FOREIGN PATENTS

| | | |
|---|---|---|
| 743,159 | 1/1956 | Great Britain. |
| 572,667 | 2/1958 | Italy. |

FRANK L. ABBOTT, *Primary Examiner.*

HENRY C. SUTHERLAND, *Examiner.*

D. R. COMUZZIE, A. C. PERHAM, *Assistant Examiners.*